Oct. 27, 1959 K. NURMSE 2,910,253

FISHING REELS

Filed Aug. 22, 1955

INVENTOR.
Karl Nurmse
BY
Pierce, Scheffler & Parker
Att'ys

United States Patent Office 2,910,253
Patented Oct. 27, 1959

2,910,253
FISHING REELS

Karl Nurmse, Svangsta, Sweden, assignor to Aktiebolaget Urfabriken, Svangsta, Sweden, a corporation of Sweden Application August 22, 1955, Serial No. 529,693

Claims priority, application Sweden August 31, 1954

4 Claims. (Cl. 242—84.5)

This invention relates to fishing reels having a line guide mounted for rotation about a line spool and a brake operable by adjustable pressure and mounted on the shaft of the spool for adjustable braking of the line spool. Fishing reels of this kind are known, in which the brake is mounted in a portion of a housing containing the driving gear for the line guide on the end of the spool shaft opposite the spool, and in which the brake is operable with a pressure adjustable by an adjusting member manually operable on the outside of the housing for rotation coaxially with the spool. Thereby the location of the adjusting member on the side of the housing turned towards the fisher has been made possible.

It is a purpose of the invention to make possible a still better location of the adjusting member by permitting any angle between the direction of operating pressure on the brake and the axis of rotation of the adjusting member independently of the location of the brake.

According to the invention, this is obtained by providing a lever pivotally mounted within the housing and adapted for operating the brake and to be itself operated by an adjusting member in a direction, which forms an angle with the direction of the pressure operating the brake.

Figure 1:
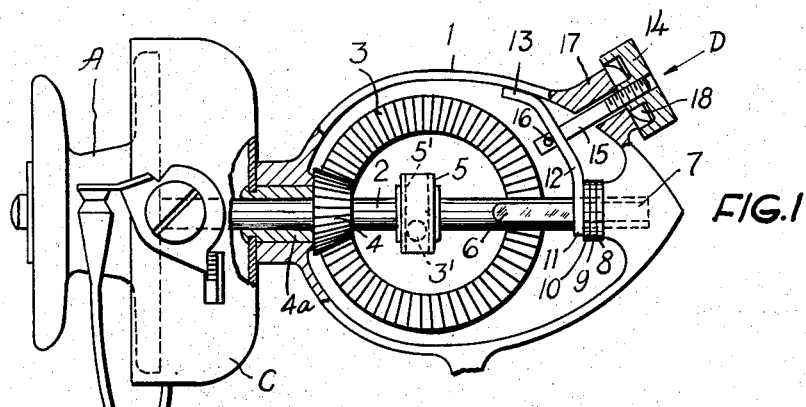
Figure 2:
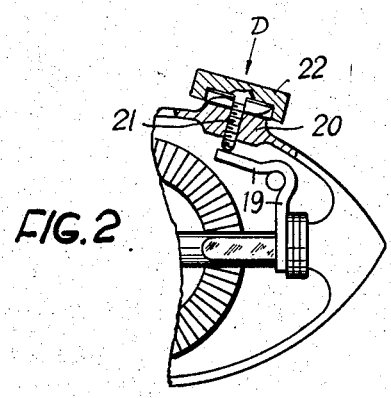
Figure 3:
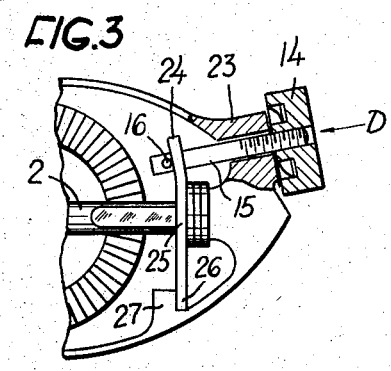

Further details in and advantages with the invention are disclosed in the following description of three embodiments of the invention illustrated in the accompanying drawings. Fig. 1 is a longitudinal section through a gear housing of a reel, Fig. 2 is a section in part through the gear housing showing a second embodiment of the invention, Fig. 3 is a section in part through the gear housing showing a third embodiment of the invention.

Referring to Fig. 1, A is the spool and B the line guide mounted on a support C and adapted for rotation around the spool A. In the forward (left) and rear (right) ends of the gear housing 1 is rotatably mounted a shaft 2, the forward end of which supports the spool. Further mounted for rotation in the gear housing 1 is a ring gear 3 operable in known manner by a crank not illustrated and engaging a bevel pinion 4 mounted for rotation in the forward end of the housing. The bevel pinion 4 has a hub portion 4a rotatably mounted in the gear housing and the line guide support C is rigidly secured to the forward extremity of the hub portion 4a. Thus as bevel gear 4a is driven by ring gear 3 the support C and line guide B will be rotated about spool A. This gearing arrangement is known in the art as illustrated by the U.S. Patent to Cowen et al. #2,641,419. The spool shaft 2 is operated by means of a member 5 which is rotatable but secured against axial displacement on the spool shaft 2, and which cooperates by means of a groove 5' with a stud 3' on the driving gear 3, so as to receive reciprocating axial motion when the driving gear 3 is rotated.

The rear end of shaft 2 has a planed portion 6 and, counted from the rear end bearing 7 in the housing, supports in the order stated, a friction disc 8 maintained against rotation in the housing, a second friction disc 9 rotatable with the shaft 2 and driven in rotation thereby, by a central hole having a configuration adapted to the section of the planed portion of the shaft, and a third friction disc 10 which, like the first brake disc 8, is maintained against rotation in the housing.

The forked end 11 of a lever 12 rests against the forward face of the third friction disc 10 and the lever is in its middle portion operatively connected with an adjusting member D, the other end 13 of the lever resting against the inner wall of the housing. The operative end 11 of the lever runs essentially at right angles with the shaft 2, the middle portion 12 essentially at right angles with the direction in which the lever is operated by the adjusting member D, and the other end 13 of the lever rests against and runs essentially parallel with wall of the housing.

The adjusting member D comprises a nut 14, placed outside the housing and screwed on a threaded pin 15, guided for longitudinal displacement in a boss 17 in the wall of the housing. The inner end of the pin 15 passes through a hole in the middle portion 12 of the lever and has on the inside thereof a securing pin 16 fixed therethrough. Thus when nut 14 is screwed in on pin 15, a traction is exerted thereon and on the middle portion 12 of the lever, the operative end 11 of which exerts a pressure on the friction discs 10, 9 and 8, thereby adjustably braking the shaft 2 and the spool A mounted thereon. The nut 14 of the adjusting member D is on its face turned towards the boss 17 and is provided with an excavation, having a corrugated bottom and enclosing a spiral blade spring 18 maintaining the nut in the adjusted position in relation to the housing.

The embodiment above described permits the disposition of the adjusting member within a range of angles with the shaft 2 of the spool between a small angle with said shaft up to an angle of more than 45° therewith.

The embodiment illustrated in Fig. 2 permits the location of the adjusting member at any angle with the shaft and is shown in the drawing at an angle slightly less than 90°. In this embodiment the lever has the form of an angle-lever resting with its bent middle portion on a fixed pin 19 in the housing. One arm of the lever extends at right angles with the spool shaft 2 and cooperates with the friction disc 10 and the other end cooperates with the end of an adjusting screw 21 threaded in a boss 20 in the wall of the housing and having on the outside thereof a head 22 for manual operation of the screw. By operating the screw head 22 the pressure of the lever 19 on the friction discs can be adjusted.

Fig. 3 illustrates a third embodiment, in which the adjusting member D has an operating direction forming a little angle with the spool shaft 2. In this embodiment the adjusting member is similar to the embodiment shown in Fig. 1 and is formed of a nut outside the housing, a threaded pin 15 guided in a boss 23 in the wall of the housing and a securing pin 16 on the inside of the lever traversed by the threaded pin. In this embodiment the adjusting member cooperates with a free end portion 24 of a lever, the middle portion 25 of which rests against the friction disc 10 and the other end 26 of which rests against a fixed abutment 27 on the inside of the wall of the housing 1.

As illustrated by the three embodiments above described, the principles of adapting the construction according to the invention to different angles between the direction of operation of the adjusting member and the direction, in which the brake discs are operated, resides in an appropriate selection of the relative positions along the lever of its fixed resting point, its portion operating the brake discs and the point thereof, at which it is operated by the adjusting member. Within each of these embodiments the angle between the direction, in which the lever is operated and the direction in which the brake discs are operated, can be varied within a relatively large range of angles. Thereby, according to the manner in which the reel is to be mounted on a rod and the position normally occupied by the reel in relation to the fisher, the adjusting member or knob can always be placed in a position giving the easiest and most natural access for the fisher's hand.

What I claim is:

1. In combination with a fishing reel having a gear housing, bearing means in opposite walls of said housing, a shaft rotatably mounted in said bearing means, one end of said shaft extending outside said housing through one of said bearing means, a line spool secured to the end of said shaft extending outside of said housing, a line guide support rotatably mounted on said shaft for rotation about said line spool, and driving gears in said gear housing for reciprocating said shaft and for rotating said line guide support; a plurality of parallel friction discs mounted on said shaft intermediate said bearing means, at least two of said friction discs being non-rotatably connected to said housing and at least one friction disc intermediate said two discs being connected to said shaft for rotation therewith, a brake operating lever entirely mounted within said gear housing for pivotal movement with respect thereto, a first portion of said lever being parallel to and in contact with one of said two friction discs and a second portion of said lever being angularly arranged with respect to said first lever portion, and means for pivotally moving said lever in a direction to cause said first lever portion to apply braking pressure on said friction discs in a direction parallel to the axis of said shaft comprising a screw-threaded adjusting member extending through an opening in an external wall of said housing, said adjusting member being angularly inclined with respect to the axis of said shaft, the end portion of said adjusting member within the housing being in engagement with said second lever portion, and means external of said housing for causing axial displacement of said adjusting member.

2. A fishing reel as defined in claim 1 wherein said second portion of said brake operating lever is intermediate said first lever portion and a third lever portion in contact with the inner wall surface of said gear housing, said lever being pivotally movable about the point of contact of said third lever portion with the housing wall.

3. A fishing reel as defined in claim 1 wherein said first and second lever portions are arranged substantially at right angles to each other and wherein said lever is pivotally movable about a point intermediate said first and second lever portions.

4. A fishing reel as defined in claim 1 wherein one end of said first lever portion is in engagement with the inner wall surface of said gear housing and wherein said second lever portion is connected to the other end of said first lever portion, said lever being pivotally movable about the point of engagement of said first lever portion with the housing inner wall.

References Cited in the file of this patent

UNITED STATES PATENTS

| | | |
|---|---|---|
| 2,624,523 | Sawitzke | Jan. 6, 1953 |
| 2,687,855 | Shakespeare et al. | Aug. 31, 1954 |
| 2,772,839 | Morton | Dec. 4, 1956 |